(12) United States Patent
Matsubara et al.

(10) Patent No.: US 7,277,896 B2
(45) Date of Patent: Oct. 2, 2007

(54) FILE SHARING SYSTEM AND CLIENT APPARATUS

(75) Inventors: Daisuke Matsubara, Kodaira (JP); Hidenori Inouchi, Higashimurayama (JP)

(73) Assignee: Hitachi, Ltd., Tokyo (JP)

( * ) Notice: Subject to any disclaimer, the term of this patent is extended or adjusted under 35 U.S.C. 154(b) by 405 days.

(21) Appl. No.: 11/062,465

(22) Filed: Feb. 22, 2005

(65) Prior Publication Data

US 2005/0289237 A1    Dec. 29, 2005

(30) Foreign Application Priority Data

Jun. 24, 2004    (JP) .............................. 2004-186148

(51) Int. Cl.
*G06F 7/00* (2006.01)
(52) U.S. Cl. .................. 707/102; 707/2; 707/100; 707/104.1; 709/232
(58) Field of Classification Search .............. 707/2, 707/100, 102, 104.1; 709/232
See application file for complete search history.

(56) References Cited

U.S. PATENT DOCUMENTS

| 6,931,450 B2 * | 8/2005 | Howard et al. ............. 709/229 |
| 2003/0225796 A1 | 12/2003 | Matsubara |
| 2004/0133650 A1 * | 7/2004 | Miloushev et al. ......... 709/213 |

FOREIGN PATENT DOCUMENTS

JP    2004-005491    3/2003

* cited by examiner

*Primary Examiner*—Tim Vo
*Assistant Examiner*—Aaron Sanders
(74) *Attorney, Agent, or Firm*—Reed Smith LLP; Stanley P. Fisher, Esq.; Juan Carlos A. Marquez, Esq.

(57) ABSTRACT

A file sharing system for managing both P2P type and C/S type shard files, wherein a management server accepts from each client a file registration request and a file access request for not only a P2P type shared file, but also a C/S type shared file, and each client executes a subsequent procedure for storing or accessing a shared file according to an acknowledgement response from the management server.

9 Claims, 17 Drawing Sheets

FIG. 4

FOLDER MANAGEMENT TABLE 160

| FOLDER ID (161) | FOLDER LOCATION INFORMATION (162) | DATE OF CREATION (163) | CREATOR NAME (164) |
|---|---|---|---|
| 001 | /xxx/yyy/zzz | 2004/01/02 | XXX |
| 002 | /xyz/abc | 2004/01/03 | YYY |
| 003 | /aaa/bb | 2004/01/15 | ZZZ |
| 004 | /xx/dd | 2004/02/12 | XYZ |
| 005 | /xy/vw/zz | 2004/03/23 | ZYX |
| ⋮ | ⋮ | ⋮ | ⋮ |

FIG. 5

FILE MANAGEMENT TABLE 170

| 171 | 172 | 173 | 174 |
|---|---|---|---|
| FILE ID | FILE LOCATION INFORMATION | DATE OF CREATION | CREATOR NAME |
| 001 | /xxx/yyy/zzz | 2004/01/02 | XXX |
| 002 | /xyz/abc | 2004/01/03 | YYY |
| 003 | /aaa/bb | 2004/01/15 | ZZZ |
| 004 | /xx/dd | 2004/02/12 | XYZ |
| 005 | /xy/vw/zz | 2004/03/23 | ZYX |

FIG. 8

FOLDER MANAGEMENT TABLE 260

| FOLDER ID (261) | SHARING TYPE (262) | DATE OF CREATION (263) | CREATOR NAME (264) | FOLDER ADDRESS (265) |
|---|---|---|---|---|
| 001 | 10 | 2004/01/02 | XXX | 192.168.34.54 |
| 002 | 01 | 2004/01/03 | YYY | 192.168.23.4 |
| 003 | 01 | 2004/01/15 | ZZZ | 192.168.23.5 |
| 004 | 10 | 2004/02/12 | XYZ | 192.168.23.4 |
| 005 | 01 | 2004/03/23 | ZYX | 192.168.234.54 |

FIG. 9

FILE MANAGEMENT TABLE 270

| 271 | 272 | 273 | 274 | 275 |
|---|---|---|---|---|
| FILE ID | SHARING TYPE | DATE OF REGISTRATION | REGISTRAR NAME | FOLDER ID |
| 001 | 10 | 2004/01/02 | XXX | 001 |
| 002 | 01 | 2004/01/03 | YYY | 002 |
| 003 | 01 | 2004/01/15 | ZZZ | 012 |
| 004 | 10 | 2004/02/12 | XYZ | 001 |
| 005 | 01 | 2004/03/23 | ZYX | 001 |

FIG. 10

DIRECTORY MANAGEMENT TABLE 280

| FILE ID (281) | FOLDER LOCATION INFORMATION (282) | FOLDER ID (283) | FILE ADDRESS (284) |
|---|---|---|---|
| 001 | /xxx/yyy/zzz | 001 | 192.168.34.54 |
| 002 | /xyz/abc | 002 | 192.168.23.4 |
| 003 | /aaa/bb | 012 | 192.168.23.5 |
| 004 | /xx/dd | 002 | 192.168.23.4 |
| 005 | /xy/vw/zz | 001 | 192.168.34.54 |

FIG. 17A

| M20 | FILE SHIFT REQUEST ~700 | SHIFT-FILE ID ~771 | ORIGINAL FOLDER ID ~772 | DESTINATION FOLDER ID ~773 |
|---|---|---|---|---|

FIG. 17B

| M21 | FILE SHIFT ACKNOWL-EDGEMENT ~700 | SHIFT-FILE ID ~781 | SHARING TYPE OF ORIGINAL FOLDER ~782 | SHARING TYPE OF DESTINATION FOLDER ~783 | DESTINATION FOLDER ADDRESS ~784 |
|---|---|---|---|---|---|

FIG. 17C

| M22 | DOWNLOAD FOR FILE SHIFT ~700 | FILE CLASSIFICATION ~791 | SHIFT-FILE ID ~792 | SHARING TYPE OF ORIGINAL FOLDER ~793 | SHARING TYPE OF DESTINATION FOLDER ~794 |
|---|---|---|---|---|---|

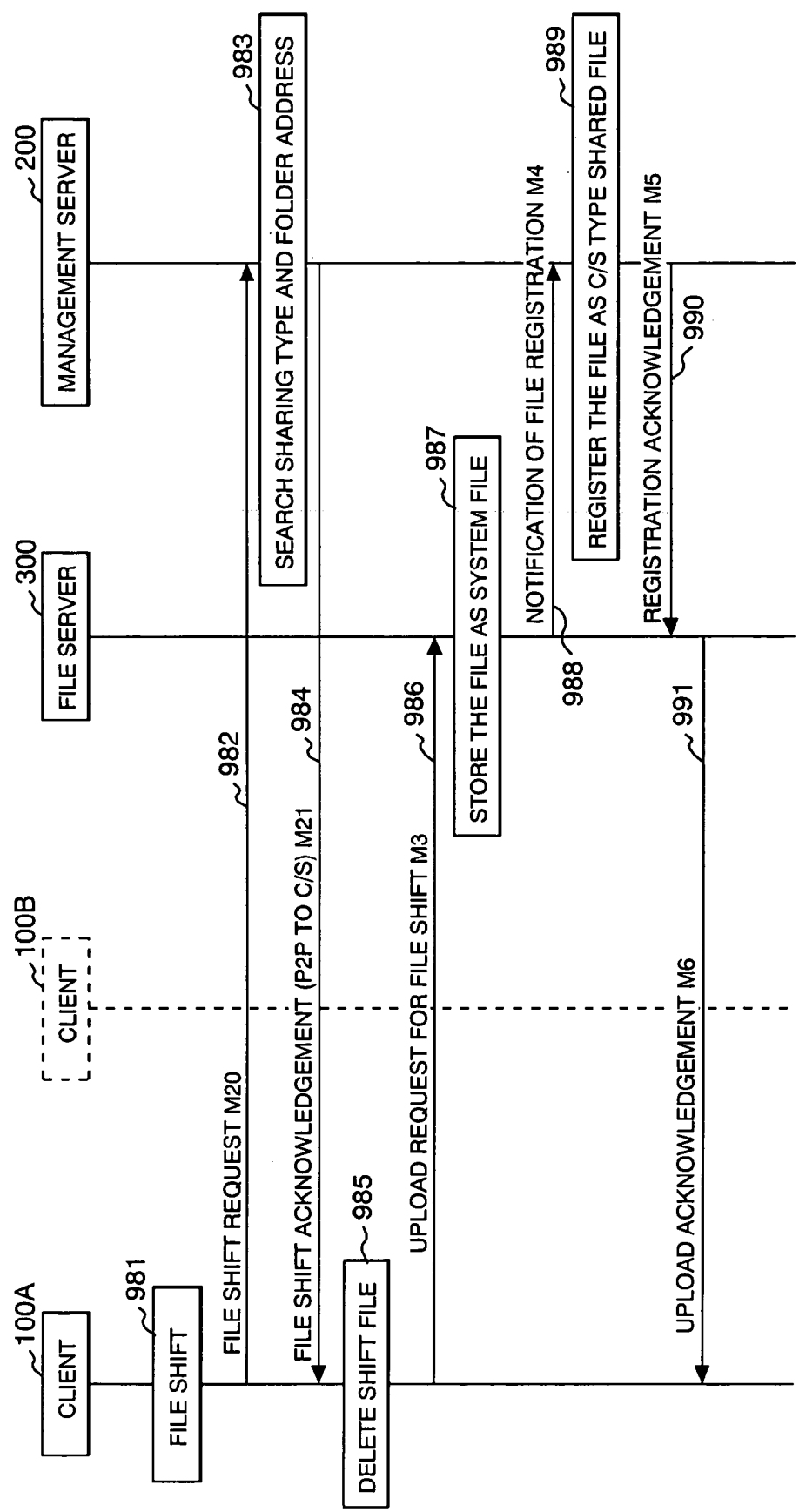

FILE SHARING SYSTEM AND CLIENT APPARATUS

CLAIM OF PRIORITY

The present application claims priority from Japanese application serial no. 2004-186148, filed on Jun. 24, 2004, the content of which is hereby incorporated by reference into this application.

BACKGROUND OF THE INVENTION (1) Field of the Invention

The present invention relates to a file sharing system and client apparatus and, more particularly, to a file sharing system and client apparatus that can take the advantages of both a Client/Server (C/S) type and a Peer to Peer (P2P) type.

(2) Description of the Related Art

As conventional file sharing systems, C/S type and P2P type file sharing systems are known. In the following description, a system file denotes a file that is managed by a file sharing system and accessible to a plurality of users and a local file denotes a file for private use that is managed by a client apparatus.

A conventional C/S type file sharing system is comprised of a file server and a plurality of clients connected to a communication network. In the C/S type file sharing system, when a client user wishes to make one of the user's local files open as a shared file, the client sends a file upload request to the file server. When the file upload is successful, the uploaded file is stored as a system file in the file server and the file server sends a file upload confirmation message to the requester client. When the client receives the file upload confirmation message, the shared file registration sequence is completed.

When a client user in the C/S type file sharing system wishes to access any open shared file, the client sends the file server a file download request designating the file identifier. In reply to the download request, the file server sends back the specified file to the requester client. The downloaded file is stored as a local file in the client apparatus.

On the other hand, the P2P type file sharing system is comprised of a management server and a plurality of clients connected to a communication network. In the P2P type file sharing system, when a client user wishes to register one of the user's local files with the sharing system as a shared file, the client sends a file registration request message to the management server. When the client receives a file registration acknowledgement message in which the file identifier is specified from the management server, the client stores a copy of the local file to be registered as a shared file into its storage as a system file and sends the management server a message to notify that the file saving has been completed. The management server registers the file identifier designated in the notification message into a management table as a new shared file, and returns an ACK message to the client. When the client receives the ACK message, the shared file registration sequence is completed.

When a client user in the P2P type file sharing system wishes to access any open shared file, the client sends the management server a file download request message designating the file identifier. Upon receiving the request message, the management server judges whether the specified file can be downloaded. If the file download is permitted, the management sever sends back the requester client a response message indicating the address of a client where the requested file is located. The requester client sends a file down load request to the client identified from the response message to receive and store the downloaded file as a local file.

As for the P2P type file sharing system, a distributed file management type system is proposed, e.g., in Japanese Unexamined Patent Publication No. 2004-5491. This system is arranged such that the management server manages directory information and each client can register a file with the sharing system by linking a system file stored in its storage to any folder represented by the directory information.

SUMMARY OF THE INVENTION

The C/S type file sharing system is suitable for centralized management of file data, because all shared files are stored in the file server as described above. However, a total amount of data available to be open in the file sharing system depends on the storage capacity of the file server. On the other hand, the total amount of data available in the P2P type file sharing system can increase, because the shared files are stored in distributed manner in a plurality of clients located across the system. In the P2P type file sharing system, however, each user allocates a part of the private memory resources in the client apparatus to store system files. Due to this, when memory space shortage occurs on a client, it is inevitable to discard a part of the shared files.

Since the P2P type and the C/S type have a merit and a demerit, as above, each user has to choose one of these types for use according to a file type and the purpose of use of file sharing. Practically, since the P2P type and the C/S type file sharing systems have been at work as independent system, it has been necessary for a user who wants to take advantage of the merits of both types to subscribe both P2P type and C/S type systems. When a user wished to change a shared file already registered with the P2P type (or C/S type) system to the file for C/S type (or P2P type), the user has to erase the P2P type (or C/S type) system file after saving the registered system file as a local file in the user's apparatus, and execute a procedure for registering that file as a new system file with the C/S type (or P2P type) system.

It is an object of the present invention to provide a file sharing system and client apparatus that can take the advantages of both the P2P type and C/S type systems.

It is another object of the present invention to provide a file sharing system and client apparatus capable of registering and accessing P2P type and C/S type files through the same user interface.

It is yet another object of the present invention to provide a file sharing system and client apparatus in which a registered P2P type or C/S type shared file can easily be changed to the file of the other sharing type.

To achieve the foregoing objects, a file sharing system of the present invention is characterized in that a management server accepts a file registration request and a file access request for not only a P2P type shared file, but also a C/S type shared file, issued from each client, and each client executes a subsequent procedure for storing or accessing a file according to an acknowledgement response from the management server.

More specifically, the file sharing system of the present invention comprises a file server and a management server connected to a plurality of clients via a network. The file sharing system is characterized in that the file server has means for notifying the management server of a C/S type shared file registration made by one of clients, and the management server has a management table including an entry for each shared file, the entry indicating file management information, for example, correspondence of file identifier, sharing type, and shared file location information, and means for managing a new shared file in the management table, according to a P2P type shared file registration notification from one of clients or a C/S type shared file registration notification from the file server. The management server sends the file location information retrieved from the management table back to a requester client in response to a shared file access request from the clients.

According to the present invention, because the same management server manages P2P type and C/S type shared file management information, it is possible to easily change a registered P2P type or C/S type shared file to the other sharing type file. One feature of the file sharing system of the present invention resides in that the management server is provided with a function of accepting a request to shift an already registered shared file or a request to change the sharing type of that file.

Specifically, the file sharing system of the present invention is characterized in that the management server is provided with means for updating in said management table, after acknowledging a shift request for a registered shared file received from one of clients, the sharing type corresponding to the identifier of the shared file to be shifted, upon completion of a sequence performed between the requester client and the file server to change the location of the registered shared file.

In an embodiment of the present invention, when a C/S type shared file stored in the file server has been downloaded to a client and changed to a P2P type shared file, the management server changes in the management table the sharing type corresponding to the identifier of the shared file from C/S type to P2P type in response to a file shift complete notification issued from the client. When a P2P type shared file stored in a client has been uploaded to the file server and changed to a C/S type shared file, the management server changes in the management table the sharing type corresponding to the identifier of the shared file from P2P type to C/S type in response to a shifted file registration complete notification issued from the file server.

According to the present invention, there is provided a management server that allows a plurality of clients connected to the management server via a network to make use of P2P type file sharing in which shared files are stored in any of the client apparatuses and C/S type file sharing in which shared files are stored in a file server connected to the management server via the network.

The management server of the present invention is provided with a management table storing an entry for each shared file, the entry indicating correspondence of at least file identifier, sharing type, and shared file location information; means for acknowledging a shared file registration request from one of clients; means for storing, in response to a shared file registration notification issued from the client or the file server in association with completion of storing the acknowledged shared file, the sharing type and file location information of the shared file into the management table; and means for notifying, in response to a shared file access request from one of clients, the requester client of the file location information retrieved from the management table.

In an embodiment of the present invention, the management table comprises a folder management table including an entry for each folder to which at least one shared file is linked, each entry indicating correspondence of at least folder identifier, sharing type, and folder location information; and a file management table including an entry for each shared file, each entry indicating correspondence of file identifier and its registration folder identifier.

Another feature of the present invention resides in that a client apparatus for communicating with a management server in a file sharing system via a network and providing file data stored in the client apparatus to another client connected to the network as a P2P type shared file, comprises first means for transmitting to the management server a request message to register file data as a C/S type shared file with a file server connected to the network, and second means for uploading file data to the file server in response to a file registration acknowledgment message received from the management server.

In an embodiment of the present invention, the client apparatus is characterized in that the first means displays on a display screen a directory tree structure comprising a group of folder icons denoting registration folders for shared files and a group of file icons denoting files stored in each folder, and transmits to the management server a shared file registration request message when a file icon denoting a shared file to be newly registered has been linked to a particular folder icon within the directory tree structure. The shared file registration request message specifies a folder identifier pre-assigned to the particular folder icon as the registration folder of the shared file. The second means uploads file data to the filer server, using the shared file identifier specified in the file registration acknowledgment message received from the management server.

In an embodiment of the present invention, the file registration acknowledgment message received from the management server specifies the sharing type of the registration folder to which the shared file is registered. The second means selectively carries out either of P2P type shared file registration for storing file data in the client apparatus and C/S type shared file registration for storing file data in the file server, according to the sharing type specified in the file registration acknowledgment message received from the management server.

According to the present invention, C/S type file sharing and P2P type file sharing can be realized in the same file sharing system. Thus, a registered P2P type or C/S type shared file can easily be changed to the file of the other sharing type and flexible operation of the system can be performed.

BRIEF DESCRIPTION OF THE DRAWINGS

FIG. 4 shows an example of a folder management table equipped in the client apparatus;

FIG. 5 shows an example of a file management table equipped in the client apparatus;

FIG. 8 shows an example of a folder management table equipped in the management server;

FIG. 9 shows an example of a file management table equipped in the management server;

FIG. 10 shows an example of a directory management table equipped in the management server;

FIG. 17A shows a format example of a file shift request message;

FIG. 17B shows a format example of a file shift acknowledgement message;

FIG. 17C shows a format example of a download request message for file shift; and FIG. 18 shows a P2P to C/S type file shift sequence in the file sharing system of the present invention.

DETAILED DESCRIPTION OF THE PREFERRED EMBODIMENTS

An embodiment of a file sharing system according to the present invention will be described hereinafter with reference to the drawings.

Figure 1:
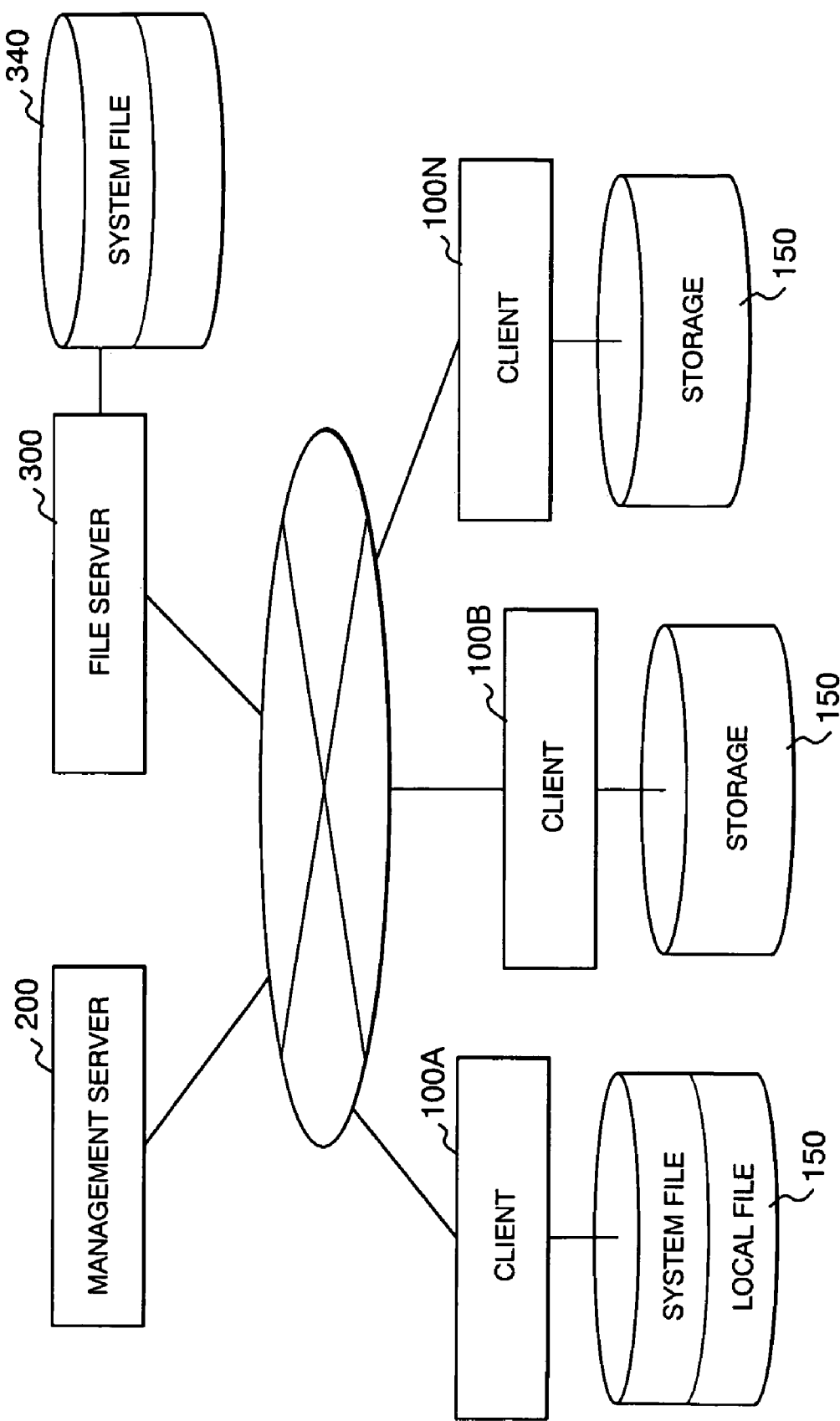
FIG. 1 shows an entire configuration of a file sharing system according to the present invention.

FIG. 1 shows an example of an entire configuration of a file sharing system according to the present invention.

The files sharing system according to the present invention is comprised of a plurality of clients 100 (100A, 100B, ... 100N), a management server 200, and a file server 300, interconnected by a network. Each client 100 has storage 150 for storing local files and system files to be used as P2P type shared files, for example, as shown for a client 100A. In the storage 150, a folder management table and a file management table necessary for accessing a shared file are prepared. Details of these tables will be described later.

Figure 2:
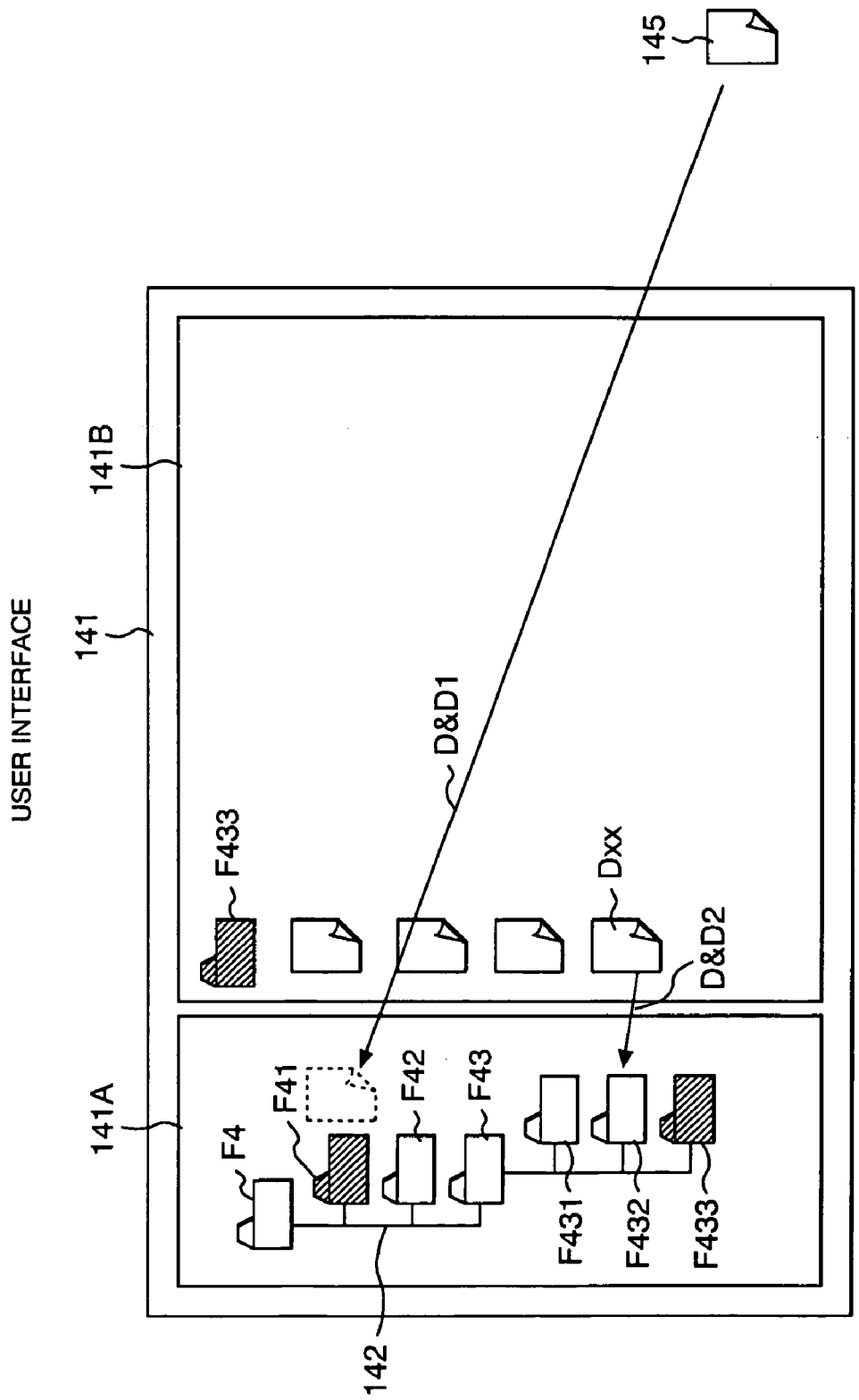
FIG. 2 shows an example of a graphical user interface to be displayed on a display screen of a client.

FIG. 2 shows an example of a graphical user interface (GUI) that is output on a display screen of each client apparatus 100.

A window 141 for accessing the file sharing system is comprised of a directory display area 141A where a directory 142 of shared folders is shown and a detail display area 141B where the contents of a folder selected in the directory display area are shown. Also, there is shown an icon 145 for a local file that the user is going to register with the system as a shared file.

The directory 142 of shared folders includes a plurality of folders arranged in a hierarchical structure. In the directory, for example, C/S type shared folders denoted by, e.g., icons F42, F43 and P2P shared folders denoted by icons F41 and F433 are mixed. Folders shown in the hierarchical structure within the display area 141A will change according to icons selected by the user.

In the file sharing system of the present invention, the user of each client can register a local file belonging to the user with the file sharing system by selecting the icon 145 of any local file and dragging and dropping the selected local file icon onto any folder icon in the shared folder directory 142, as denoted by an arrow D&D1. The local file is registered as a C/S type shared file or a P2P type shared file depending on the sharing type of the folder onto which the local file was dragged and dropped. Details of this operation will be described below.

The user can shift a registered system file to change the sharing type by dragging and dropping, e.g., a registered file icon Dxx under a P2P type folder F433 onto a C/S type folder F432, for example, as denoted by an arrow D&D2. By clicking a file icon selected by the cursor, the user can download the shared file corresponding to that file icon from another client or the file server to the user's apparatus.

Figure 3:
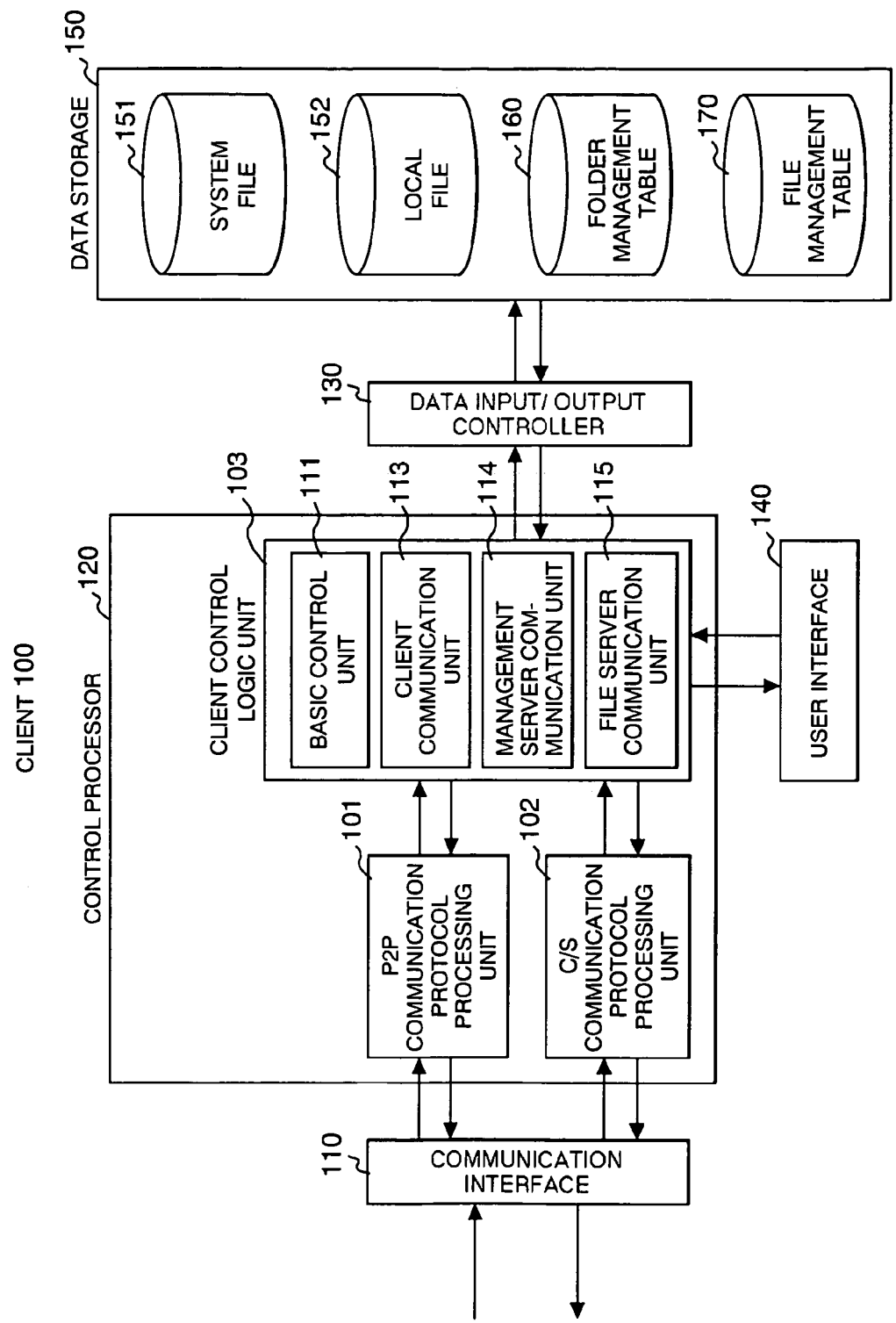
FIG. 3 is a block diagram showing an example of a client apparatus configuration.

FIG. 3 is a bock diagram showing the configuration of the client apparatus 100.

The client apparatus 100 is comprised of the following physical components: a communication interface 110 for connection to the network; a control processor 120; a data input/output controller 130; a user interface 140; data storage 150 connected to the data input/output controller 130. The user interface 140 comprises input/output devices such as a display, keyboard, and mouse.

The control processor 120 includes, as logical components realized by software stored in the memory, a P2P communication protocol processing unit 101, C/S communication protocol processing unit 102, and client control logic unit 103. The client control logic unit 103 comprises a basic control unit 111, client communication unit 113, management server communication unit 114, and file server communication unit 115. The data storage 150 includes a system file area 151, local file area 152, and other areas where a folder management table 160 and a file management table 170 are stored.

The folder management table 160 is comprised of, for example, as shown in FIG. 4, a plurality of table entries each having a folder ID 161. Each of the entries indicates, with respect to a folder identified by the folder ID 161, folder location information 162, date of creation of the folder 163, and folder creator name 164.

The file management table 170 is comprised of, for example, as shown in FIG. 5, a plurality of table entries each having a file ID 171. Each of the entries indicates, with respect to a file identified by the file ID 171, file location information 172, date of creation of the file 173, and file creator name 174.

Here, the folder location information 162 and file location information 172 logically indicate the position of a folder or file in the directory structure illustrated in FIG. 2. For instance, when the user selects a particular folder icon in the window 141 with the cursor, the basic control unit 111 of the client obtains folder location information corresponding to the icon selected by the user from a section of the hierarchical structure being displayed on the display screen and the position of the selected icon. By referring to the folder management table 160, the basic control unit gets the folder ID 161 corresponding to the folder location information. When the user selects a file icon in the window 141, the basic control unit obtains file location information corresponding to the selected icon in the same way. In the case where the selected icon is a file icon, the basic control unit refers to the file management table 170 and gets the file ID 171 corresponding to the file location information 172.

Figure 6:
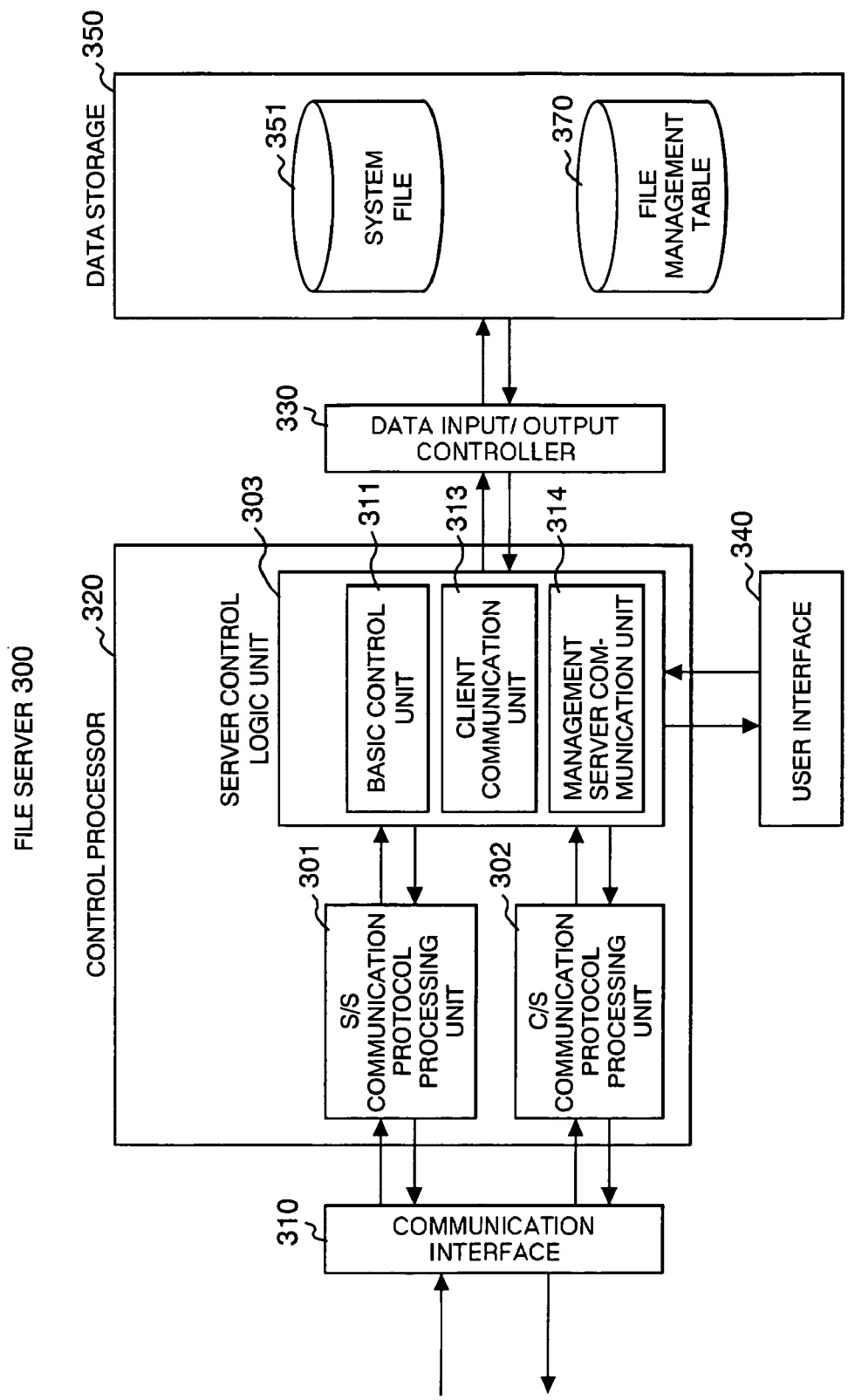
FIG. 6 is a block diagram showing an example of a file server configuration.

FIG. 6 is a block diagram showing a configuration of the file server 300.

The file server 300 is comprised of the following physical components: a communication interface 310 for connection to the network; a control processor 320; a data input/output controller 330; a user interface 340; and data storage 350 connected to the data input/output controller 330. The user interface 340 comprises input/output devices such as a display, keyboard, and mouse for operation by an administrator of the file sharing system.

The control processor 320 includes, as logical components realized by software stored in the memory, an S/S communication protocol processing unit 301 for executing inter-server communication protocol processing, a C/S communication protocol processing unit 302, and a server control logic unit 303. The server control logic unit 303 comprises a basic control unit 311, client communication unit 313, and management server communication unit 314. In the data storage 350, a system file area 351 and an area for storing a file management table 370 are prepared.

Figure 7:
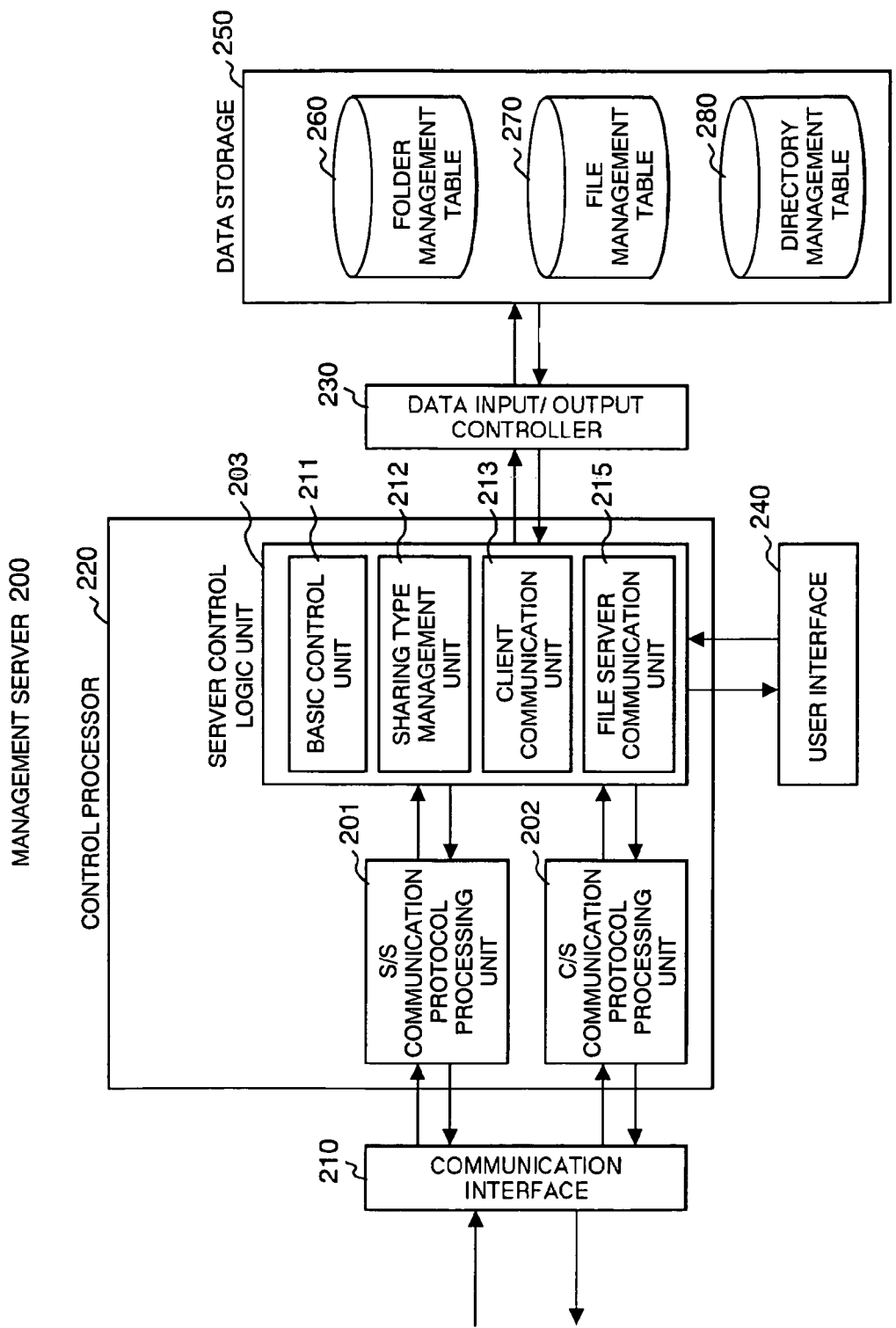
FIG. 7 is a block diagram showing an example of a management server configuration.

FIG. 7 is a block diagram showing a configuration of the management server 200.

The management server 200 is comprised of the following physical components: a communication interface 210 for connection to the network; a control processor 220; a data input/output controller 230; a user interface 240; and data storage 250 connected to the data input/output controller 230. The user interface 240 comprises input/output devices such as a display, keyboard, and mouse for operation by an administrator of the file sharing system.

The control processor 220 includes, as logical components realized by software stored in the memory, an S/S communication protocol processing unit 201, a C/S communication protocol processing unit 202, and a server control logic unit 203. The server control logic unit 203 comprises a basic control unit 211, sharing type management unit 212, a client communication unit 213, and a file server communication unit 215. In the data storage 250, a folder management table 260, a file management table 270, and a directory management table 280 are stored.

The folder management table 260 is referred to by the basic control unit 211 of the management server 211, and comprised of, for example, as shown in FIG. 8, a plurality of table entries each having a folder ID 261. Each of the entries indicates, with respect to a folder identified by a folder ID 261, sharing type 262, date of creation of the folder 263, folder creator name 264 and folder address 265.

In the present embodiment, a value "01" of the sharing type 262 denotes the C/S type and a value "10" denotes the P2P type. The folder address 265 denotes address information (the IP address) of a server or a client that holds the folder.

The file management table 270 is comprised of, for example, as shown in FIG. 9, a plurality of table entries each having a file ID 271. Each of the entries indicates, with respect to a file identified by the file ID 271, sharing type 272, date of registration as a shared file 273, registrar name 274, and folder ID 275 in which the file was registered.

The directory management table 280 is comprised of, for example, as shown in FIG. 10, a plurality of table entries each having a file ID 281. Each of the entries indicates, with respect to a file identified by the file ID 281, folder location information 282 for a folder in which the file was registered, folder ID 283, and file address (folder address) 384.

Next, by referring to FIG. 11, C/S type shared file registration sequence and download sequence in the file sharing system of the present invention will be described. Here, a communication sequence will be described in the case where a client 100A user registers a local file belonging to the user with the file server 300 as a C/S type shared file and a client 100B user downloads the shared file registered with the file server 300 to the client terminal.

(1) Registering a C/S Type Shared File

When the client 100A user has started a program for the file sharing system and logged into the system, a connection between the client 100A and the management server 200 is set up and latest folder directory information is downloaded from the management server 200 to the client 100A. The basic control unit 111 of the client 100A creates the folder management table 160 and the file management table 170 according to the downloaded folder directory information, and displays the directory 142 of shared folders in the directory display area 141A in the window 141 for accessing the sharing system, described in conjunction with FIG. 2.

The client 101A user selects a local file (file icon 145 in FIG. 2) that the user wishes to register as a shared file out of local files stored in the data storage 150. For example, the user drags and drops with a mouse the file icon 145 onto a registration folder, e.g., a C/S type folder icon F42, to which a file corresponding to the file icon 145 should be registered, within the folder directory 142, (step 930 in FIG. 11).

By this drag and drop operation, the identifiers of the file icon 145 and the registration folder icon F42 are transferred to the basic control unit 111. The basis control unit 111 figures out the location of the registration folder, assigns a file ID to the local file denoted by the file icon 145, and gets the folder ID corresponding to the folder location information of the registration folder by referring to the folder management table 160 in the data storage 150.

The basic control unit 111 creates a file registration request message M1 in which the local file ID, folder ID, and other information for the file are described and passes the message M1 to the management server communication unit 114. The management server communication unit 114 outputs the file registration request message M1 to the C/S communication protocol processing unit 102. The C/S communication protocol processing unit 102 appends a packet header including the IP address of the management server 200 as the destination address to the file registration request message M1 and transmits the message in IP packet form from the communication interface 110 to the network (step 931 in FIG. 11).

Figure 12:
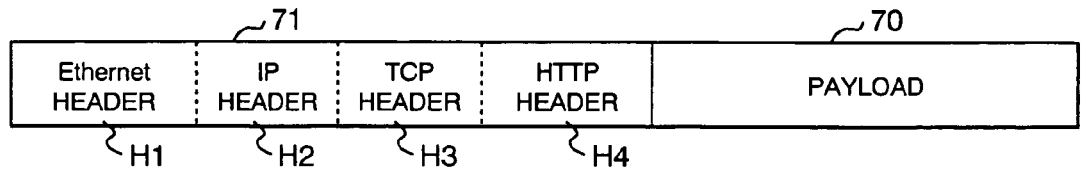
FIG. 12 shows a format example of a packet to be communicated over the network for the file sharing system of the present invention.

A packet that is transferred over the network is comprised of payload part 70 including the message body and a header part 71 as shown in FIG. 12. The header part 71 shown here is comprised of an Ethernet header H1, IP header H2, TCP header H3, and HTTP header H4.

Figure 13A:
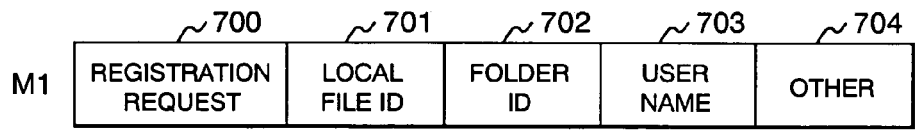
FIG. 13A shows a format example of a file registration request message.

The file registration request message M1 includes, for example, as shown in FIG. 13A, a message type indicator 700 indicating registration request, the file ID 701 of the local file to be registered as a shared file, the folder ID 702 of the registration folder, a user name 703, and other information 704. The other information 704 includes, for example, a file name, file size obtainable from the OS, and file type (application program).

The IP packet including the file registration request message M1 transmitted to the network is received by the communication interface 210 of the management server 200 and passed to the C/S communication protocol processing unit 202. The C/S communication protocol processing unit 202 extracts the file registration request message M1 from the payload of the received IP packet and passes the message M1 to the client communication unit 213. The client communication unit 213 transfers the file registration request message M1 to the basic control unit 211.

Having received the file registration request message M1, the basic control unit 211 refers to other file information 704 in the received message and determines whether the local file requested to register is acceptable as a shared file. If registering the file as a shared file is permitted, the basic control unit 211 instructs the sharing type management unit 212, designating the folder ID 702 specified in the received message, to search for the sharing type and address of the folder. In response to the instruction, the sharing type management unit 212 retrieves the sharing type and folder address corresponding to the folder ID 702 from the folder management table 260 in the data storage 250 and informs the basic control unit 211 of the retrieval results (step 932 in FIG. 11).

Figure 13B:
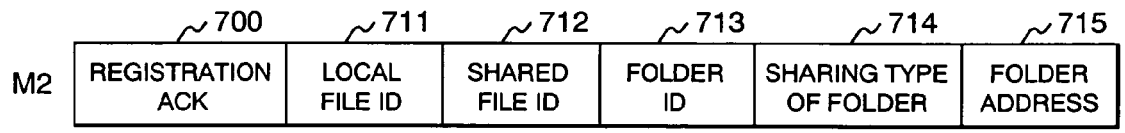
FIG. 13B shows a format example of a file registration acknowledgement message.

Having been informed of the sharing type and folder address, the basic control unit 211 assigns a new file ID that becomes valid in the file sharing system (hereinafter, referred to as a shared file ID) to the local file and creates a file registration acknowledgement message M2. The file registration acknowledgement message M2 includes, for example, as shown in FIG. 13B, following the message type indicator 700 indicating registration ACK, local file ID 711, shared file ID 712, registration folder ID 713, sharing type 714 of the registration folder, and folder address 715. In this instance, a code designating the C/S sharing type is set as the sharing type 714 and the IP address of the file server 300 is set as the folder address 715.

The file registration acknowledgement message M2 is output via the client communication unit 213 to the C/S communication protocol processing unit 202. The C/S communication protocol processing unit 202 appends the headers H1 to H4 including the IP address of the client 100A as the destination address to the message M2 and transmits the message in IP packet form from the communication interface 210 to the network (step 933 in FIG. 11).

The IP packet including the file registration acknowledgement message M2 is received by the communication interface 110 of the client 10A, and the file registration acknowledgement message M2 is extracted from the payload by the C/S communication protocol processing unit 102. The message M2 is transferred via the management server communication unit 114 to the basic control unit 111.

Having received the file registration acknowledgement message M2, the basic control unit 111 of the client 100A checks the sharing type 714 of the folder. If the sharing type 714 of the folder indicates "C/S type," the basic control unit 111 reads out file data corresponding to the local file ID 711 from the local file area 152 of the data storage 150 and creates an upload message M3 shown in FIG. 13C. Thereafter, the basic control unit 111 manages that file data using the shared file ID.

Figure 13C:
FIG. 13C shows a format example of a file upload request message.

The upload message M3 includes, as shown in FIG. 13C, following the message type indicator 700 indicating file upload, file classification 721, shared file ID 722, registration folder ID 723, user name 724, and file data 725. For the file to be registered with the file server 300 as a C/S type shared file, the file classification 721 indicates whether the shared file is one that is newly registered with the file sharing system or a shared file that has already been registered as a P2P type and is requested to shift its location from a client to the fileserver. The latter file will be referred to a "shift-file" hereinafter. In this instance being discussed, a code denoting a new file is set as the file classification 721 of the upload message M3.

The upload message M3 is fed via the client communication unit 113 to the C/S communication protocol processing unit 102. The C/S communication protocol processing unit 102 appends the headers H1 to H4 including the address of the file server 300 as the destination IP address to the message and transmits the message in IP packet form from the communication interface 110 to the network (step 934 in FIG. 11).

The IP packet including the upload message M3 is received by the communication interface 310 of the file server 300. The C/S communication protocol processing unit 302 extracts the upload message M3 from the payload and transfers the message via the client communication unit 313 to the basic control unit 311.

The basic control unit 311 of the file server 300 checks the file classification 721 in the received message M3. If the file classification 721 indicates a new file, the basic control unit 311 extracts the file data 725 from the received message M3, stores the file as a new system file into the system file area 351 of the data storage 350, and registers the system file location in association with the file ID obtained from the received message M3 into the file management table 370 in the data storage 350 (step 935 in FIG. 11).

Figure 13D:
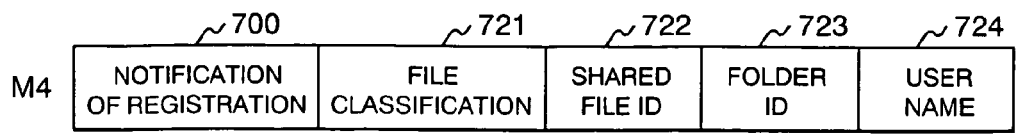
FIG. 13D shows a format example of a file registration notification message.

Then, the basic control unit 311 creates a file registration notification message M4 which is shown in FIG. 13D and outputs the message M4 via the management server communication unit 314 to the S/S communication protocol processing unit 301. The S/S communication protocol processing unit 301 appends the headers H1 to H4 including the IP address of the management server 200 as the destination IP address to the message and transmits the message in IP packet form from the communication interface 310 to the network (step 936 in FIG. 11). The file registration notification message M4 includes, as shown in FIG. 13D, following the message type indicator 700 indicating notification of file registration, file classification 731, shared file ID 732, registration folder ID 733, and user name 734.

The IP packet including the file registration notification message M4 is received by the communication interface 210 of the management server 200. The S/S communication protocol processing unit 201 extracts the file registration notification message M4 from the payload and transfers the message via the file server communication unit 215 to the basic control unit 211. Having received the file registration notification message M4, the basic control unit 211 checks the file classification 731. If the file classification 731 indicates a new file, the basic control unit 211 instructs the sharing type management unit 212, designating the shared file ID 732, registration folder ID 733, and user name 734 obtained from the received message, to register a new entry into the file management table 270, and waits for a registration complete notification from the sharing type management unit 212.

Figure 11:
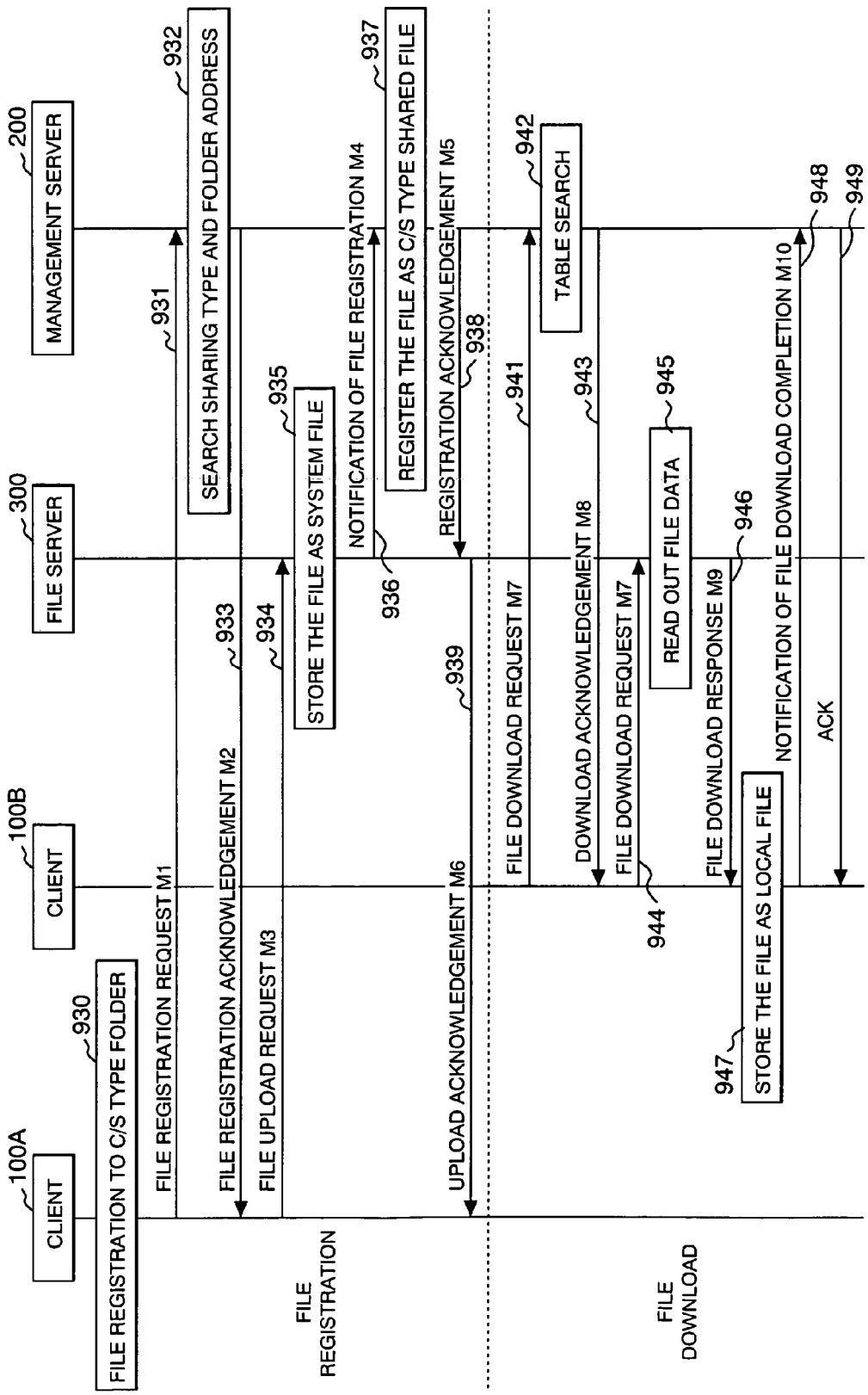
FIG. 11 shows C/S type shared file registration sequence and download sequence in the file sharing system of the present invention.

The sharing type management unit 212 retrieves the sharing type (C/S type in this instance) 262 corresponding to the folder ID from the folder management table 260 in the data storage 250 via the data input/output controller 230, and registers a new entry indicating correspondence of shared file ID, registration folder ID, user name, that are received from the basic control unit 211, the sharing type, and date of registration into the file management table 270 (step 937 in FIG. 11). The current date is automatically set as the data of registration. Then, the sharing type management unit 212 sends the registration complete notification including the sharing type (C/S type) back to the basic control unit 211.

Upon receiving the registration complete notification from the sharing type management unit 212, the basic control unit 211 checks the sharing type in the notification. If the sharing type is C/S type, the basic control unit 211 creates a registration acknowledgement message M5 and outputs the message via the file server communication unit 215 to the S/S communication protocol processing unit 201. The S/S communication protocol processing unit 201 appends the headers H1 to H4 including the IP address of the file server 300 as the destination IP address to the registration acknowledgement message M5 and transmits the message in IP packet form from the communication interface 210 to the network (step 938 in FIG. 11). The registration acknowledgement message M5 includes, following the message type indicator 700 indicating registration acknowledgement, file classification, shared file ID, and registration folder ID, which are the same as those in the file registration notification message M4.

The IP packet including the registration acknowledgement message M5 is received by the communication interface 310 of the file server 300. The C/S communication protocol processing unit 302 extracts the registration acknowledgement message M5 from the payload and transfers the message M5 via the client communication unit 313 to the basic control unit 311.

Having received the registration acknowledgement message M5, the basic control unit 311 of the file server 300 creates an upload acknowledgement message M6 to be a reply to the upload request message M3 and outputs the message M6 via the client communication unit 313 to the C/S communication protocol processing unit 302. The upload acknowledgement message M6 includes the same items of information as those in the registration acknowledgement message M5. The C/S communication protocol processing unit 302 appends the headers H1 to H4 including the IP address of the client 100A as the destination IP address to the upload acknowledgement message M6 received and transmits the message in IP packet form from the communication interface 310 to the network (step 939 in FIG. 11). When the client 100A receives the upload acknowledgement message M6, the file registration sequence terminates.

(2) Downloading a C/S Type Shared File

Next, a download sequence in which the client 100B user downloads a C/S type shared file is described with reference to FIG. 11.

The client 100B user starts the program for the file sharing system in the same way as the client 100A user does to display the window 141 for accessing the sharing system. The user selects any of C/S type shared folders, e.g., F42, F43, F431 and F432 in the directory display area 141A illustrated in FIG. 2 and clicks one of the file icons displayed in the detail display area 141B.

In response to the file icon click, the identifier of the file icon selected by the user is transferred via the user interface 140 to the basic control unit 111. The basic control unit 111 detects the occurrence of a download request, figures out the file location of the selected file icon, and gets the file ID corresponding to the file location information by referring to the file management table 170 in the data storage 150. Then, the basic control unit 111 creates a file download request message M7 including the file ID and outputs the message via the management server communication unit 114 to the C/S communication protocol processing unit 102.

Figure 14A:
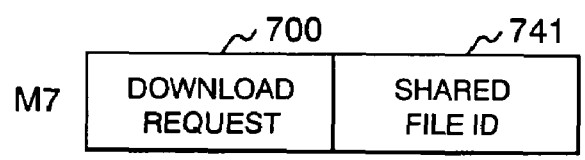
FIG. 14A shows a format example of a file down load message.

The file download request message M7 includes, as shown in FIG. 14A, following the message type indicator 700 indicating download request, the file ID 741 of the shared file to be downloaded. The C/S communication protocol processing unit 102 appends the headers H1 to H4 including the IP address of the management server 200 as the destination IP address to the file download request message M7 and transmits the message in IP packet form from the communication interface 110 to the network (step 941 in FIG. 11).

The IP packet including the file download request message M7 is received by the communication interface 210 of the management server 200. The C/S communication protocol processing unit 202 extracts the file download request message M7 from the payload and transfers the message M7 via the client communication unit 213 to the basic control unit 211. Having received the file download request message M7, the basic control unit 211 instructs the sharing type management unit 212, designating the file ID 741 specified in the received message, to search for the appropriate sharing type and folder address.

In response to the instruction from the basic control unit 211, the sharing type management unit 212 retrieves the sharing type 272 and registration folder ID 275 corresponding to the file ID from the file management table 270 in the data storage 250, retrieves the folder address 265 corresponding to the registration folder ID 275 from the folder management table 260, and sends back the retrieval results to the basic control unit 211 (step 942 in FIG. 11).

Figure 14B:
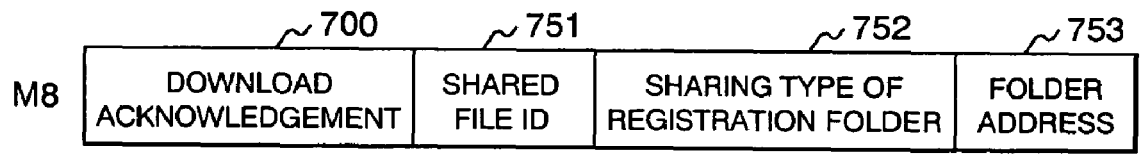
FIG. 14B shows a format example of a file download acknowledgement message.

Based on the retrieval results, the basic control unit 211 creates a download acknowledgement message M8 and outputs the message via the client communication unit 213 to the C/S communication protocol processing unit 202. The download acknowledgement message M8 includes, as shown in FIG. 14B, following the message type indicator 700 indicating download ACK, the descriptions of shared file ID 751, sharing type 752 of the registration folder, and folder address 753. In this context, the folder address 753 designates the IP address of the file server 300.

The C/S communication protocol processing unit 202 appends the headers H11 to H4 including the IP address of the requester client 100B as the destination address to the download acknowledgement message M8 and transmits the message in IP packet form from the communication interface 210 to the network (step 943 in FIG. 11).

The IP packet including the download acknowledgement message M8 is received by the communication interface 110 of the client 100B. The C/S communication protocol processing unit 102 extracts the download acknowledgement message M8 from the payload and transfers the message via the management server communication unit 114 to the basic control unit 111.

Having received the download acknowledgement message M8, the basic control unit 111 creates a file download request message M7 again and outputs the message via the file server communication unit 115 to the C/S communication protocol processing unit 102. The C/S communication protocol processing unit 102 appends the headers H1 to H4 to the file download request message M7 and transmits the message in IP packet form from the communication interface 110 to the network (step 944 in FIG. 11). At this time, the IP address of the file server 300 designated with the folder address 753 of the download acknowledgement message MB is applied as the destination IP address.

The IP packet including the file download request message M7 is received by the communication interface 310 of the file server 300. The C/S communication protocol processing unit 302 extracts the file download request message M7 from the payload and transfers the message via the client communication unit 313 to the basic control unit 311. Having received the file download request message M7, the basic control unit 311 reads out, from the file management table 370 in the data storage 350, the address of a storage location of a system file corresponding to the shared file ID 741 specified in the received message. Based on that address, the basic control unit 311 reads out file data having the shared file ID 741 from the system file area 351 (step 945 in FIG. 11).

Figure 14C:
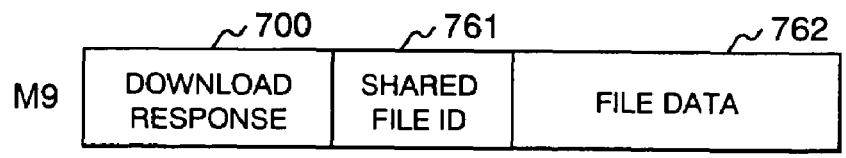
FIG. 14C shows a format example of a file download response message.

Then, the basic control unit 311 creates a file download response message M9 including the file data and outputs the message via the client communication unit 313 to the C/S communication protocol processing unit 302. The file download response message M9 includes, as shown in FIG. 14C, following the message type indicator 700 indicating download response, the shared file ID 762 and file data 762.

The C/S communication protocol processing unit 302 appends the headers H1 to H4 including the IP address of the requester client 100B as the destination IP address to the file download response message M9 and transmits the message in IP packet form from the communication interface 310 to the network (step 946 in FIG. 11).

The IP packet including the file download response message M9 is received by the communication interface 110 of the client 100B. The C/S communication protocol processing unit 102 extracts the file download response message M9 from the payload and transfers the message via the file server communication unit 115 to the basic control unit 111. The basic control unit 111 extracts the file data 762 from the file download response message M9 and stores the file data into the local file area 152 as new local file data (step 947 in FIG. 11).

Then, the basic control unit 111 creates a download complete notification message M10 and outputs the message via the management server communication unit 114 to the C/S communication protocol processing unit 102. The C/S communication protocol processing unit 102 appends the headers H1 to H4 including the IP address of the management server 200 as the destination IP address to the download complete notification message M1 and transmits the message in IP packet form from the communication interface 110 to the network (step 948 in FIG. 11). Having received the download complete notification message M10, the management server 200 performs internal processing in association with the use of the shared file, if necessary, and returns an ACK message (step 949 in FIG. 11). When the client 100B receives the ACK message, the file download sequence is completed.

Next, by referring to FIG. 15, a registration sequence in which the client 100A user registers a P2P type shared file and a download sequence in which the client 100B user downloads a P2P type shared file will be described.

(3) Registering a P2P Type Shared File

Figure 15:
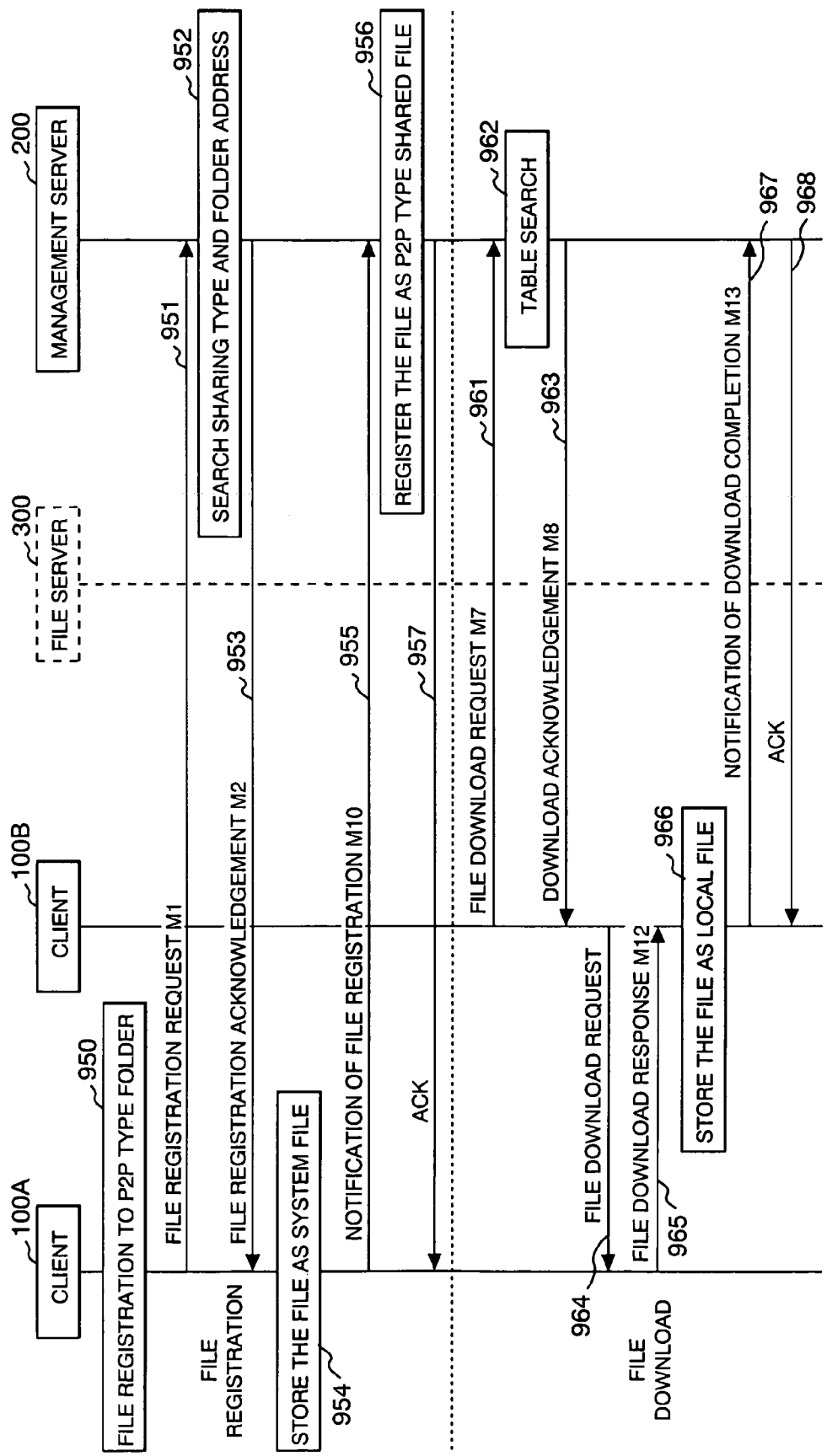
FIG. 15 shows P2P type shared file registration sequence and download sequence in the file sharing system of the present invention.

The P2P shared file registration sequence starts when the client 100A user drags and drops a file icon 145 onto a P2P type folder icon, e.g., an icon F433 in the above-described window 141 for accessing the file sharing system (step 950 in FIG. 15). Here, the P2P folder corresponding to the icon F433 in which the selected shared file should be stored is the one that the client 100A user has registered beforehand with the management server 200 in the folder registration procedure. In the folder management table 260, an entry including the IP address of the client 100A as the folder address 265 corresponding to the folder ID exists.

When the file icon 145 is dragged and dropped onto the P2P type folder icon, the basic control unit 111 of the client 100A assigns a file ID to the local file denoted by the file icon 145 and creates a file registration request message M1, as same in the case performed when registering a C/S type shared file. The file registration request message M1 created at this time has the same format as shown in FIG. 13A. However, only the value of the registration folder ID 702 differs from that in the registration request message for a C/S type shared file.

The file registration request message M1 in IP packet form including the IP address of the management server 200 as the destination IP address is transmitted to the network (step 951 in FIG. 15). The message is received by the communication interface 210 of the management server 200 and transferred to the basic control unit 211.

In the same way as described for step 932 in FIG. 11, the basic control unit 211 assigns a shared file ID to the local file to be registered, retrieves the sharing type of the registration folder and folder address (step 952 in FIG. 15), and creates a file registration acknowledgement message M2 shown in FIG. 13B. In this instance, a code designating P2P type is set as the sharing type 714 of the registration folder. After the C/S communication protocol processing unit 202 appends the headers including the IP address of the client 101A as the destination IP address to the message M2, the message is transmitted in IP packet form to the network (step 953 in FIG. 15).

The IP packet including the registration acknowledgement message M2 is received by the communication interface 110 of the client 10A. The C/S communication protocol processing unit 102 extracts the registration acknowledgement message M2 from the payload and transfers the message via the management server communication unit 114 to the basic control unit 111. Having received the registration acknowledgement message M2, the basic control unit 111 checks the sharing type 714 of the registration folder. At this time, since the sharing type is P2P type, the basic control unit 111 reads out the local file having the local file ID 711, which should be registered, from the local file area 152 in the data storage 150, stores the local file as a new system file with the shared file ID 721 into the system file area 151, and adds a new entry with the shared file ID to the file management table 170 (step 954 in FIG. 15).

Then, the basic control unit 111 creates a file registration notification message M10 including the shared file ID and outputs the message via the management server communication unit 114 to the C/S communication protocol processing unit 102. The C/S communication protocol processing unit 102 appends the headers H1 to H4 including the IP address of the management server 200 as the destination IP address to the file registration notification message M10 and transmits the message in IP packet from the communication interface 110 to the network (step 955 in FIG. 15). The format of the file registration notification message M10 is the same as the file registration notification message M4 shown in FIG. 13D.

The IP packet including the file registration notification message M10 is received by the communication interface 210 of the management server 200. The C/S communication protocol processing unit 202 extracts the file registration notification message M10 from the payload and transfers the message via the client communication unit 213 to the basic control unit 211. Having received the file registration notification message M10, the basic control unit 211 checks the file classification 731. If the file classification is a new file, the basic control unit instructs the sharing type management unit 212 to register a new entry into the file management table 270 in the same way as described for step 937 in FIG. 11 and waits for a registration complete notification from the sharing type management unit 212. In this instance, the sharing type management unit 212 sends the registration complete notification of the sharing type (P2P type) back to the basic control unit 211 after registering a new entry record into the file management table 270 (step 956 in FIG. 15).

In the case where the sharing type is P2P, the basic control unit 211 creates an ACK message and outputs the message via the client communication unit 213 to the C/S communication protocol processing unit 202. The C/S communication protocol processing unit 202 appends the headers H1 to H4 including the IP address of the client 100A as the destination IP address to the ACK message and transmits the message in IP packet form from the communication interface 210 to the network (step 957 in FIG. 15). When the client 100A receives the ACK message, the P2P type shared file registration sequence terminates.

(4) Downloading a P2P Type Shared File

Next, a download sequence in which the client 100B user downloads a P2P type shared file is described with reference to FIG. 15.

The client 100B user selects any P2P type shared folder, e.g., F41 or F433 in the directory display area 141A shown in FIG. 2, selects one of the file icons displayed in the detail display area, and clicks a download request button. Here, it is assumed that the user has selected a file icon denoting a shared file stored as a system file in the client apparatus 100A.

In response to the click operation of the download request button, the identifier of the file icon selected by the user is transferred via the user interface 140 to the basic control unit 111. Upon detecting the occurrence of a download request, the basic control unit 111 retrieves the file ID from the file management table 170 based on the file location information of the selected file icon, as described by referring to FIG. 11. The basic control unit 111 creates a file download request message M7 including the file ID shown in FIG. 14A, and outputs the message via the management server communication unit 114 to the C/S communication protocol processing unit 102. The C/S communication protocol processing unit 102 converts the file download request message M7 into an IP packet with the destination IP address of the management server and transmits the IP packet from the communication interface 110 to the network (step 961 in FIG. 15).

The IP packet is received by the management server 200. Upon receiving the file download request message M7, the basic control unit 211 instructs the sharing type management unit 212 to search for the appropriate sharing type and folder address in the same way as described for step 942 in FIG. 11, and receives the retrieval results from the sharing type management unit 212 (step 962 in FIG. 15). The basic control unit 211 creates a download acknowledgement message M8 shown in FIG. 14B based on the retrieval results. In the download acknowledgement message M8 created at this time, the sharing type 752 of the registration folder indicates P2P type and the folder address 753 specifies the IP address of the client 10A. The C/S communication protocol processing unit 202 converts the download acknowledgement message M8 into an IP packet having the IP address of the requester client 100B as the destination and transmits the IP packet from the communication interface 210 to the network (step 963 in FIG. 15).

The IP packet is received by the client 100B and the download acknowledgement message M8 is transferred to the basic control unit 111. Then, the basic control unit 111 creates a file download request message M7 again and outputs the message via the file server communication unit 115 to the C/S communication protocol processing unit 102. The C/S communication protocol processing unit 102 converts the file download request message M7 into an IP packet and transmits the IP packet from the communication interface 110 to the network (step 964 in FIG. 15). At this time, the IP address of the client 100A designated with the folder address 753 of the download acknowledgement message M8 is applied to the destination IP address of the IP packet.

Accordingly, the IP packet including the file download request message M7 is received by the communication interface 110 of the client 100A and transferred to the P2P communication protocol processing unit 101. The P2P communication protocol processing unit 101 extracts the file download request message M7 from the payload of the received packet and transfers the message via the client communication unit 113 to the basic control unit 111. Having received the file download request message M7, the basic control unit 111 reads out file data corresponding to the shared file ID 741 specified in the file download request message M7 from the system file area 151 of the data storage 150 and creates a file download response message M12 including the file data.

The file download response message M12 includes, following the message type indicator 700 indicating download response, the shared file ID and file data, like the file download response message M9 that the file server 300 creates. The file download response message M12 is output via the client communication unit 113 to the P2P communication protocol processing unit 101, converted into IP packet form having the IP address of the client 100B as the destination IP address, and transmitted from the communication interface 110 to the network (step 965 in FIG. 15).

Upon receiving the file download response message M12, the basic control unit 111 of the client 100B stores the file data 762 extracted from the received message into the data storage as local file data (step 966 in FIG. 15) and creates a file download complete notification message M13. The C/S communication protocol processing unit 102 converts the file download complete notification message M13 into an IP packet having the IP address of the management server 200 as the destination IP address and transmits the IP packet to the network (step 967 in FIG. 15).

Upon receiving the down load complete notification message M13, the basic control unit 211 of the management server 200 performs internal processing in association with the use of the shared file, if necessary, and returns an ACK message to the client 100B (step 968 in FIG. 15). When the client 100B receives the ACK message, the file download sequence is completed.

Next, changing the sharing type of a registered shared file in the file sharing system of the present invention will be described. First, a sequence for changing a registered C/S type shared file to a P2P type one will be described with reference to FIG. 16.

(5) Changing from C/S Type to P2P Type

Figure 16:
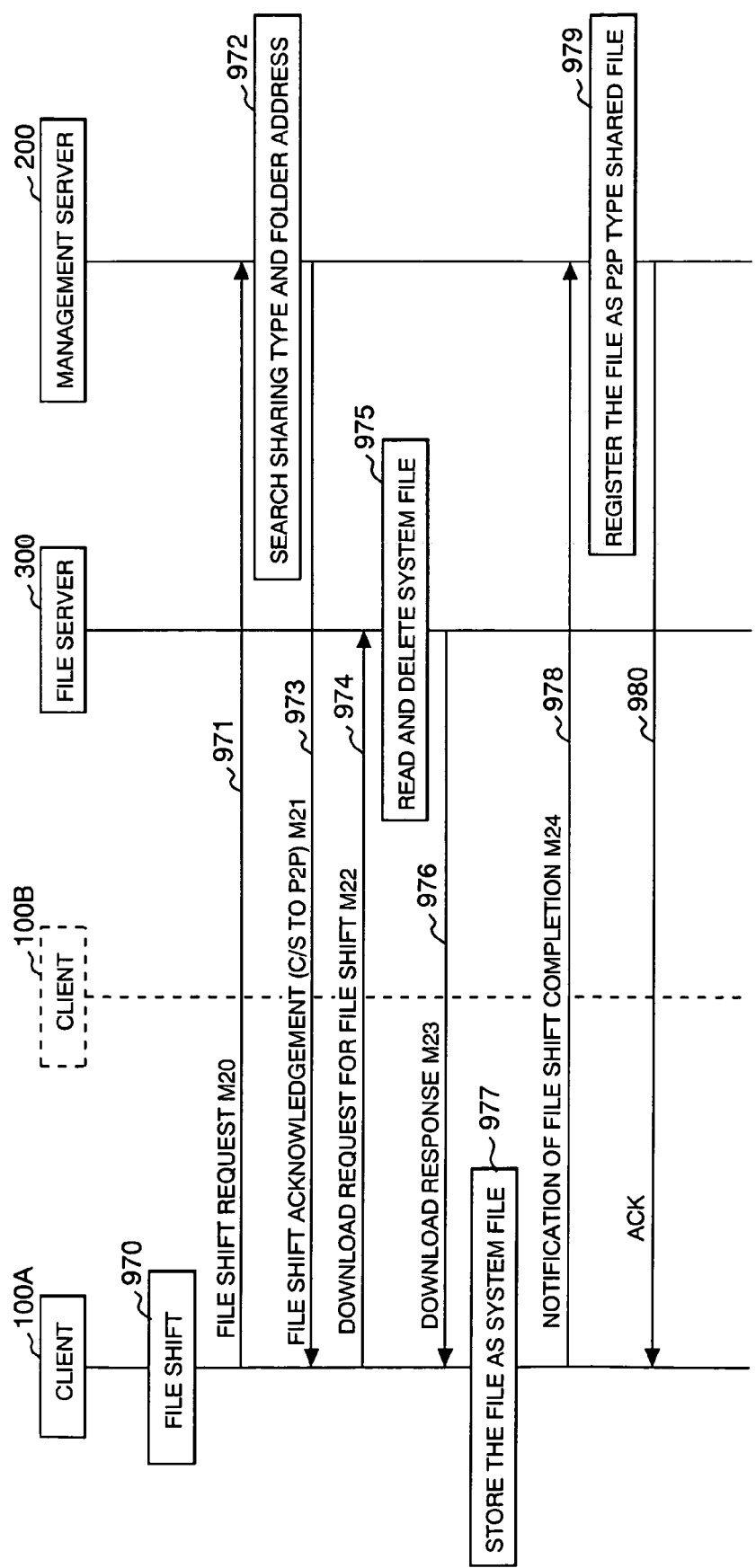
FIG. 16 shows a C/S to P2P type file shift sequence in the file sharing system of the present invention.

In the state that the window 141 for accessing the file sharing system is displayed on the display screen, if the client 100A user selects a file icon Fx of a registered C/S type shared file and drags and drops the selected file icon onto a folder icon Fy of a P2P folder created by the user, the identifier of the file icon Fx and the identifier of the folder icon Fy are transferred via the user interface 140 to the basic control unit 111 (step 970 in FIG. 16).

Upon detecting that the file icon Fx has been dragged 110 and dropped onto the folder icon Fy, the basic control unit 111 figures out the locations of these icons Fx and Fy, based on the configuration of the folder directory being displayed, and retrieves the file ID corresponding to the file icon Fx from the file management table 170 in the data storage 150. The basic control unit 111 further retrieves from the folder management table 160, the ID of the "shift to" folder, which will also be referred to as the destination folder hereinafter, corresponding to the folder icon Fy, and the ID of the current registration folder ("shift from" folder, which will be also referred to as the original folder hereinafter) of the shared file denoted by the file icon Fx.

The basic control unit 111 creates a file shift request message M20 based on these IDs, and outputs the message via the management server communication unit 114 to the C/S communication protocol processing unit 102. The file shift request message M20 includes, as shown in FIG. 17A, following the message type indicator 700 indicating file shift request, ID of file to be shifted 771 which will be referred to as "shift-file ID" hereinafter, original folder ID 772, and destination folder ID.

The C/S communication protocol processing unit 102 appends the headers H1 to H4 including the IP address of the management server 200 as the destination address to the file shift request message M20 and transmits the message in IP packet from the communication interface 110 to the network (step 971 in FIG. 16).

The IP packet including the file shift request message M20 is received by the communication interface 210 of the management server 200. The C/S communication protocol processing unit 202 extracts the file shift request message M20 from the payload and transfers the message via the client communication unit 213 to the basic control unit 211. Having received the file shift request message M20, the basic control unit 211 instructs the sharing type management unit 212, designating the original folder ID and destination folder ID obtained from the received message, to search for the sharing type of each folder and the destination folder address.

In response to the instruction, the sharing type management unit 212 retrieves the sharing type corresponding to the original folder ID and the sharing type and folder address corresponding to the destination folder ID from the folder management table 260 in the data storage 250 (step 972 in FIG. 16) and sends the retrieval results back to the basic control unit 211.

Having received the retrieval results from the sharing type management unit 212, the basic control unit 211 creates a file shift acknowledgement message M21 and outputs the message via the client communication unit 213 to the C/S communication protocol processing unit 202. The file shift acknowledgement message M21 includes, as shown in FIG. 17B, following the message type indicator 700 indicating file shift acknowledgement, shift-file ID 781, sharing type of original folder 782, sharing type of destination folder 783, and destination folder address 784.

The C/S communication protocol processing unit 202 appends the headers H1 to H4 including the IP address of the requester client 100A as the destination address to the file shift acknowledgement message M21 and transmits the message in IP packet form from the communication interface 210 onto the network (step 973 in FIG. 16).

The IP packet including the file shift acknowledgement message M21 is received by the communication interface 110 of the client 10A. The C/S communication protocol processing unit 102 extracts the file shift acknowledgement message M21 from the payload and transfers the message via the management server communication unit 114 to the basic control unit 111. Having received the file shift acknowledgement message M21, the basic control unit 111 recognizes, from the relation between the sharing type of original folder 782 and sharing type of destination folder 783, that the request to change the system file having the shared file ID 781 from C/S type to P2P type was accepted.

In this context, the basic control unit 111 creates a download request message for file shift M22 from C/S type to P2P type, which is shown in FIG. 17C, and outputs the message via the file server communication unit 115 to the C/S communication protocol processing unit 102. The download request message for file shift M22 includes, following the message type indicator 700 indicating download for file shift, file classification (shift-file in this instance) 791 and the values extracted from the shift acknowledgement message M21; namely, the shared file ID to be shifted 792, sharing type of original folder (C/S type in this instance) 793, and sharing type of destination folder (P2P type in this instance) 794.

The C/S communication protocol processing unit 102 appends the headers H1 to H4 including the IP address of the file server 300 as the destination IP address to the download request message M22 and transmits the message in IP packet form from the communication interface 110 to the network (step 974 in FIG. 16).

The IP packet including the download request message for file shift M22 is received by the communication interface 310 of the file server 300. The C/S communication protocol processing unit 302 extracts the download request message for file shift M22 from the payload and transfers the message via the client communication unit 313 to the basic control unit 311.

Having received the download request message for file shift M22, the basic control unit 311 retrieves the location of a system file corresponding to the shift-file ID specified in the message M22 from the file management table 370 in the data storage 350 and reads out file data of the system file having the shift-file ID from the system file area 351. At this time, since the file classification 791 in the download request message M22 indicates a file to be shifted, it is unnecessary for the file server 30 to keep the file data of the requested system file in the data storage 350, unlike an ordinary download. Thus, the basic control unit 311 deletes the system file from the storage 351 and deletes the entry having the shift-file ID from the file management table 370 (step 975 in FIG. 16).

After that, the basic control unit 311 creates a download response message M23 for file shift including the file data of the requested system file and outputs the message via the client communication unit 313 to the C/S communication protocol processing unit 302. The download response message M23 has the same format as the download response message M9 shown in FIG. 14C.

The C/S communication protocol processing unit 302 appends the headers H1 to H4 including the IP address of the requester client 100A as the destination IP address to the download response message M23 received and transmits the message in IP packet form from the communication interface 310 to the network (step 976 in FIG. 16).

The IP packet including the download response message M23 is received by the communication interface 110 of the client 10A. The C/S communication protocol processing unit 102 extracts the download response message M23 from the payload and transfers the message via the management server communication unit 114 to the basic control unit 111. Having received the download response message M23, the basic control unit 111 stores the filed at a extracted from the received message into the system file area 151 of the data storage 150 and manages the file data with the shared file ID 751 obtained from the received message (step 977 in FIG. 16).

Then, the basic control unit 111 creates a file shift complete notification message M24 and outputs the message via the management server communication unit 114 to the C/S communication protocol processing unit 102. The file shift complete notification message M24 includes, following the message type indicator 700 indicating notification of file shift completion, the same items 731 to 734 as that in the file registration notification message M4 shown in FIG. 13D. In this context, a code designating a shift-file is set as the file classification 731.

The C/S communication protocol processing unit 102 appends the headers H1 to H4 including the IP address of the management server 200 as the destination address to the file shift complete notification message M24 and transmits the message in IP packet form from the communication interface 110 onto the network (step 978 in FIG. 16).

The IP packet including the file shift complete notification message M24 is received by the communication interface 210 of the management server 200. The C/S communication protocol processing unit 202 extracts the file shift complete notification message M24 from the payload and transfers the message via the client communication unit to the basic control unit 211. Having received the file shift complete notification message M24, the basic control unit 211 checks the file classification 731.

In this instance, since the file classification 731 indicates a shift-file, the basic control unit 211 instructs the sharing type management unit 212, designating the shared file ID, parent (destination) folder ID, and sharing type, to modify the entry of the shared file in the file management table 270. For the entry having the specified shared file ID in the file management table 270, the sharing type management unit 212 replaces the values of the sharing type 272 and registration folder ID 275 with the sharing type and folder ID designated by the basic control unit 211 (step 979 in FIG. 16), and sends a change complete notification to the basic control unit 211.

Having received the change complete notification from the sharing type management unit 212, the basic control unit 211 creates an ACK message and outputs the message via the client communication unit 213 to the C/S communication protocol processing unit 202. The C/S communication protocol processing unit 202 appends the headers H1 to H4 including the IP address of the client 100A as the destination IP address to the ACK message and transmits the message in IP packet form from the communication interface 210 to the network (step 980 in FIG. 16). When the client 100A receives the ACK message, the file shift sequence terminates.

(6) Changing from P2P type to C/S Type

Next, a sequence for changing a registered P2P type shared file to a C/S type one will be described with reference to FIG. 18.

In the state that the window 141 for accessing the file sharing system is displayed on the display screen, if the client 100A user selects a file icon Fx of a registered P2P type shared file and drags and drops the selected file icon onto a folder icon Fz of a C/S type folder, the identifier of the file icon Fx and the identifier of the folder icon Fz are transferred via the user interface 140 to the basic control unit 111 (step 981 in FIG. 18).

Upon detecting that the file icon Fx has been dragged and dropped onto the folder icon Fz, the basic control unit 111 figures out the locations of these icons Fx and Fz, based on the configuration of the folder directory being displayed, and retrieves the file ID corresponding to the file icon Fx from the file management table 170 in the data storage 150. The basic control unit 111 further retrieves, from the folder management table 160, the ID of the destination folder corresponding to the folder icon Fz and the ID of the current registration folder (original folder) of the shared file denoted by the file icon Fx.

Based on these IDs, the basic control unit 111 creates a file shift request message M20 shown in FIG. 17A. In the same procedure as described for step 971 in FIG. 16, the file shift request message M20 is transmitted in IP packet form to the management server 200 (step 982 in FIG. 16) and, then, transferred to the basic control unit 211 of the management server 200.

Having received the file shift request message M20, in the same way as described for step 972 in FIG. 16, the basic control unit 211 instructs the sharing type management unit 212 to search for the sharing types of the original and destination folders and the destination folder address (step 983 in FIG. 18). Having received the retrieval results from the sharing type management unit 212, the basic control unit 211 creates a file shift acknowledgement message M21 shown in FIG. 17B and transmits the message in IP packet form to the client 100A (step 984 in FIG. 18).

Having received the file shift acknowledgement message M21, the basic control unit 111 of the client 100A recognizes, from the relation between the sharing type of original folder 782 and sharing type of destination folder 783, that the request to change the system file having the shared file ID 781 from P2P type to C/S type was accepted. Then, the basic control unit 111 reads out file data having the shared file ID 781 from the system file area 151 in the data storage 150 and creates an upload request message M3 for file shift in the message format shown in FIG. 13C.

As the file classification 721 of the upload request message M3 created at this time, a classification code indicating a shift-file is set. For P2P to C/S type system file change like this instance, it is unnecessary for the client 100A to save the system file having the shared file ID 781 in the data storage 150, because the storage location of the file is changed to the file server. Thus, the basic control unit 11 deletes that system file data from the system file 151 (step 985 in FIG. 18).

The upload request message M3 for file shift is transmitted to the network in IP packet form addressed to the file server 300 (step 986 in FIG. 18). The message is received by the communication interface 310 of the file server 300 and transferred to the basic control unit 311.

Having received the upload request message M3, the basic control unit 311 stores the file data extracted from the received message M3 into the system file area 351 in the data storage 350 and adds a new entry to the file management table 370 in the same way as is the case when having received the upload request message M3 described for FIG. 11 (step 987 in FIG. 18). After that, the basic control unit 311 creates a file registration message M4 and transmits the message in IP packet form to the management server 200 (step 988 in FIG. 18). In the file registration message M4 created at this time, the file classification 731 has the same classification code designating a shift-file as in the received upload request message M3.

Having received the file registration message M4, the basic control unit 211 of the management server 200 judges from the file classification 731 that the message is the notification of file registration issued in association with the file shift and instructs the sharing type management unit 212 to change, in the file management table 270, the sharing type 272 from P2P type to C/S type in a table entry corresponding to the shared file ID specified in the received message M4 (step 989 in FIG. 18). In the same way as described for step 938 in FIG. 11, the basic control unit 211 of the management server 200 creates a registration acknowledgement message M5 and transmits the message to the file server 300 (step 990 in FIG. 18). In the same way as described for step 939 in FIG. 11, in response to receiving the registration acknowledgement message M5, the file server 300 creates an upload acknowledgement message M6 and transmits the message to the client 100A (step 991 in FIG. 18).

While the above embodiment illustrates the file sharing system comprising the management server 200 and the file server 300, in which the file server 300 cooperates with the management server 200 to store C/S type shared files and provide a service of downloading file data to a client, the present invention can also be applied to a system configuration in which the management server 200 cooperates with a plurality of file servers.

According to the above embodiment, when a client issues, designating its registration folder ID, an access request (registration request or download request) for a shared file, the management server 200 can notify the client of the device address where the registration folder exists by means of a response message (registration acknowledgment M2 or download acknowledgement M8) because the management server 200 manages address information for all folders (or files). Therefore, when the client requests to access a C/S type registration folder, even if a plurality of file servers exist, the management server 200 can notify the client of the appropriate file server to which the client should get access. Consequently, according to the present invention, by distributing C/S type shared files across a plurality of file servers, a file sharing system with expanded storage capacity and improved speed of server response can be provided.

While the above embodiment discusses the case where a client user registers a P2P type shared file in a folder having the address of the user's client apparatus as the folder address, a P2P type shared file may be stored in a folder existing on any other client by using a distributed file management type directory presented, e.g., in patent document 1.

In this case, a plurality of files stored in different client apparatuses will be linked to a folder. For this reason, the management server 200 having receives a file download request for a P2P type shared file is considered impossible to identify the address of a destination client terminal to which the second file download request should be transmitted, even if the management server 200 identifies the registration folder ID of the requested file from the file management table 270 shown in FIG. 9 and searches the folder management table 260 in FIG. 8 according to the folder ID. Therefore, in the case where P2P type shared files are managed using the distributed file management type directory, it is advisable to add a field to the registration request message M1 and specify the client terminal address to which the file download request should be transmitted in the field. In this case, the client address may be registered into the file management table 270 when a shared file is registered.

What is claimed is:

1. A file sharing system comprising a file server and a management server, and allowing a plurality of clients connected to the system via a network to make use of peer to peer (P2P) type file sharing in which shared files are stored in any of the clients and client/server (C/S) type file sharing in which shared files are stored in said file server, wherein said file server has means for notifying said management server of a C/S type shared file registration made by one of said clients, and said management server has a management table including an entry for each shared file, the entry indicating correspondence of at least file identifier, sharing type, and shared file location information, and means for managing the sharing type and file location information of a new shared file in said management table according to a shared file registration notification received from one of said clients or said file server, and means for sending the file location information retrieved from said management table back to a requester client in response to a shared file access request from the requester client, wherein when a P2P type shared file stored in said requester client has been uploaded to said file server and changed to a C/S type shared file, said management server changes in said management table the sharing type corresponding to the identifier of the file from P2P type to C/S type in response to a shifted file registration complete notification issued from said file server.

2. The file sharing system according to claim 1, wherein said management server has means for updating in said management table, after acknowledging a shift request for a registered shared file received from one of said clients, the sharing type corresponding to the identifier of the shared file to be shifted, upon completion of a sequence performed between the requester client and said file server to change the location of the registered shared file.

3. The file sharing system according to claim 2, wherein when a C/S type shared file stored in said file server has been downloaded to said requester client and changed to a P2P type shared file, said management server changes in said management table the sharing type corresponding to the identifier of the shared file from C/S type to P2P type in response to a file shift complete notification issued from said requester client.

4. A management server for use in a file sharing system which allows a plurality of clients connected to the management server via a network to make use of peer to peer (P2P) type file sharing in which shared files are stored in any of the client apparatuses and client/server (C/S) type file sharing in which shared files are stored in a file server connected to the management server via said network, said management server comprising:

a management table storing an entry for each shared file, said entry indicating correspondence of at least file identifier, sharing type, and shared file location information, wherein when a P2P type shared file stored in a requester client has been uploaded to said file server and changed to a C/S type shared file, said management server changes in said management table the sharing type corresponding to the identifier of the file from P2P type to C/S type in response to a shifted file registration complete notification issued from said file server;

means for acknowledging a shared file registration request from one of said clients;

means for storing, in response to a shared file registration notification issued from one of said clients or said file server in association with completion of storing the acknowledged shared file, the sharing type and file location information of said shared file into said management table; and means for notifying, in response to a shared file access request from one of said clients, the requester client of the file location information retrieved from said management table.

5. The management server for use in the file sharing system according to claim 4, further comprising:

means for acknowledging a shift request for a registered shared file from one of said clients, and means for changing in said management table, in response to a notification of completion of storing the shifted file, which is issued from the client or file server where the shared file already registered has been shifted, the sharing type corresponding to the identifier of the shifted file.

6. The management server for use in the file sharing system according to claim 4, wherein said management table is comprised of:

a folder management table including an entry for each folder to which at least one shared file is linked, the entry indicating correspondence of folder identifier, sharing type, and folder location information; and a file management table including an entry for each shared file, the entry indicating correspondence of file identifier and its registration folder identifier.

7. A client apparatus for communicating with a management server in a file sharing system via a network and providing file data stored therein to another client connected to said network as a P2P type shared file, said client apparatus comprising:

first means for transmitting to said management server a request message to register file data as a C/S type shared file with a file server connected to said network, wherein said management server includes a management table storing an entry for each shared file, said entry indicating correspondence of at least file identifier, sharing type, and shared file location information; and second means for uploading the file data to said file server in response to a file registration acknowledgment message from said management server, wherein when a P2P type shared file has been uploaded to said file server and changed to a C/S type shared file, said management server changes in said management table the sharing type corresponding to the identifier of the file from P2P type to C/S type in response to a shifted file registration complete notification issued from said file server.

8. The client apparatus according to claim 7, wherein, said first means displays on a display screen a directory tree structure comprising a group of folder icons denoting registration folders for shared files and a group of file icons denoting files stored in each folder, and transmits to said management server a shared file registration request message when a file icon denoting a shared file to be newly registered has been linked to a particular folder icon within said directory tree structure, said shared file registration request message specifying a folder identifier pre-assigned to the particular folder icon as the registration folder of the shared file, and said second means uploads file data to said filer server, using the shared file identifier specified in the file registration acknowledgment message received from said management server.

9. The client apparatus according to claim 8, wherein the file registration acknowledgment message received from said management server specifies the sharing type of the registration folder to which the shared file is registered, and said second means selectively carries out either of P2P type shared file registration for storing file data in the client apparatus or C/S type shared file registration for storing file data in said file server, according to the sharing type specified in the file registration acknowledgment message received from said management server.

* * * * *